United States Patent
Chen et al.

(10) Patent No.: US 9,557,878 B2
(45) Date of Patent: Jan. 31, 2017

(54) PERMITTING PARTICIPANT CONFIGURABLE VIEW SELECTION WITHIN A SCREEN SHARING SESSION

(75) Inventors: Ying Chen, Sanjose, CA (US); Joel Duquene, Raleigh, NC (US); James P. Eberwein, Raleigh, NC (US); Dong K. Lieu, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 356 days.

(21) Appl. No.: 13/455,704

(22) Filed: Apr. 25, 2012

(65) Prior Publication Data

US 2013/0290863 A1    Oct. 31, 2013

(51) Int. Cl.
  G06F 3/01     (2006.01)
  G06F 3/0481   (2013.01)
  G06Q 10/10    (2012.01)
  G06F 3/00     (2006.01)

(52) U.S. Cl.
  CPC ............ *G06F 3/0481* (2013.01); *G06Q 10/10* (2013.01)

(58) Field of Classification Search
  USPC 715/747, 704, 738, 758, 733, 751; 345/157, 502
  See application file for complete search history.

(56) References Cited

U.S. PATENT DOCUMENTS

| | | | |
|---|---|---|---|
| 5,841,977 A * | 11/1998 | Ishizaki et al. | 709/204 |
| 6,601,087 B1 * | 7/2003 | Zhu et al. | 709/205 |
| 7,895,521 B2 | 2/2011 | Bhogal et al. | |
| 7,934,002 B2 | 4/2011 | Salesky et al. | |
| 8,609,134 B2 * | 12/2013 | Yoneto et al. | 424/449 |
| 2001/0037366 A1 * | 11/2001 | Webb et al. | 709/204 |
| 2002/0129106 A1 * | 9/2002 | Gutfreund | 709/205 |
| 2004/0054802 A1 * | 3/2004 | Beauchamp et al. | 709/238 |
| 2004/0179036 A1 * | 9/2004 | Teplov et al. | 345/751 |
| 2004/0252185 A1 * | 12/2004 | Vernon et al. | 348/14.08 |
| 2004/0253991 A1 * | 12/2004 | Azuma | 455/566 |
| 2006/0031779 A1 * | 2/2006 | Theurer et al. | 715/781 |
| 2006/0161624 A1 * | 7/2006 | Montgomery et al. | 709/204 |
| 2006/0168533 A1 * | 7/2006 | Yip et al. | 715/753 |
| 2006/0208871 A1 * | 9/2006 | Hansen | 340/506 |
| 2008/0005244 A1 * | 1/2008 | Vernon et al. | 709/204 |
| 2008/0162635 A1 * | 7/2008 | Keren | 709/204 |
| 2009/0254843 A1 * | 10/2009 | Van Wie et al. | 715/757 |

(Continued)

*Primary Examiner* — Toan Vu

(74) *Attorney, Agent, or Firm* — Patents on Demand P.A.; Brian K. Buchheit; Scott M. Garrett

(57) ABSTRACT

A screen sharing session between a participating computer and a presenting computer can be established. A copy of a graphical user interface screen from the presenting computer can be presented within a display on the participating computer. A selection of the sub-portion of the copy of the graphical user interface screen from the participating computer can be received. Boundaries of the sub-portion can be determined and can be transmitted from the participating computer to the presenting computer. Responsive to receiving the boundaries, the remotely located computer can define the sub-portion of the graphical user interface screen of the presenting computer. The defined sub-portion of the graphical user interface screen can be conveyed over a network from the presenting computer to the participating computer without conveying data for other portions of the graphical user interface screen.

20 Claims, 4 Drawing Sheets

(56) References Cited

U.S. PATENT DOCUMENTS

| | | |
|---|---|---|
| 2010/0028846 A1* | 2/2010 | Cohen et al. ................. 434/323 |
| 2010/0262925 A1* | 10/2010 | Liu et al. ...................... 715/759 |
| 2010/0271288 A1 | 10/2010 | Srinivasan et al. |
| 2011/0004888 A1* | 1/2011 | Srinivasan et al. ........... 719/329 |
| 2011/0191695 A1* | 8/2011 | Dinka et al. ................. 715/753 |
| 2011/0271211 A1* | 11/2011 | Jones et al. .................. 715/753 |
| 2011/0279634 A1* | 11/2011 | Periyannan et al. ........ 348/14.09 |
| 2011/0296303 A1* | 12/2011 | Duquene et al. ............. 715/704 |
| 2011/0314387 A1* | 12/2011 | Gold et al. .................... 715/751 |
| 2012/0011451 A1* | 1/2012 | Bansal et al. ................ 715/753 |
| 2012/0023407 A1* | 1/2012 | Taylor ........................... 715/731 |
| 2012/0036452 A1* | 2/2012 | Coleman et al. ............. 715/751 |
| 2012/0098733 A1* | 4/2012 | Masuda et al. ................ 345/2.2 |
| 2012/0143605 A1* | 6/2012 | Thorsen et al. .............. 704/235 |
| 2012/0151383 A1* | 6/2012 | Kazan et al. ................. 715/753 |
| 2012/0216131 A1* | 8/2012 | Moyers et al. ............... 715/757 |
| 2012/0220355 A1* | 8/2012 | Haltovsky et al. ............. 463/16 |
| 2012/0288843 A1* | 11/2012 | Shaffer et al. ................ 434/350 |
| 2012/0297305 A1* | 11/2012 | Hehmeyer et al. ........... 715/733 |
| 2012/0314018 A1* | 12/2012 | Wengrovitz et al. ...... 348/14.08 |
| 2013/0024418 A1* | 1/2013 | Sitrick et al. ................. 707/608 |
| 2013/0055113 A1* | 2/2013 | Chazin et al. ................ 715/758 |
| 2013/0086487 A1* | 4/2013 | Findlay et al. ............... 715/753 |
| 2013/0111428 A1* | 5/2013 | Begel et al. .................. 717/101 |
| 2013/0117432 A1* | 5/2013 | Jiang ............................ 709/223 |
| 2013/0147903 A1* | 6/2013 | Weiser et al. .............. 348/14.08 |
| 2013/0159414 A1* | 6/2013 | Zhou ............................. 709/204 |
| 2013/0239009 A1* | 9/2013 | DeGrazia ...................... 715/738 |
| 2013/0285882 A1* | 10/2013 | Jiang et al. .................... 345/1.3 |
| 2014/0156756 A1* | 6/2014 | Ding et al. .................... 709/204 |
| 2014/0245190 A1* | 8/2014 | Bragdon et al. .............. 715/753 |

* cited by examiner

PERMITTING PARTICIPANT CONFIGURABLE VIEW SELECTION WITHIN A SCREEN SHARING SESSION

BACKGROUND

The present invention relates to the field of collaborative computing.

Web conferencing has become a staple of enterprise collaboration permitting exchange of ideas and resources over geographically distant locations. Web conferencing technologies often include capabilities that permit real-time collaboration and remote log-in functionality. For example, desktop sharing can allow remote access and remote collaboration on a person's computer by a remote participant. Traditional web conferencing often can include a participant, such as a presenter, coordinating the conference. During conferences, a presenter often can be required to determine what content is to be transmitted and presented to other participants. Participants of a conference can receive selected content and can have no control over what content is being transmitted to their display devices. Further, when a participant views previously recorded presentations from a remote location, the participant can have no control over what content of the presentation is being transmitted to their display devices. That is, for cases in which multiple participants can access a web conference, each participant can have the same information transmitted to their display devices.

Several drawbacks of this approach arbitrarily limit participant control of received and presented content. In many cases, only certain portions of the presentation are relevant to a particular participant. That is, relevant portions of content within a presentation can differ from one participant to another participant. Consequently, each participant may be forced to view content that is relevant and content which can be irrelevant. This drawback can quickly become prevalent when a participant utilizes a display device that has a smaller screen. For example, smaller display devices often shrink the shared content to adequately present the content within the screen. Consequently, small display devices can make it difficult for a user to focus on the relevant shared content of the presentations and ignore the irrelevant content.

These drawbacks can exist even when the shared content is part of a single application. For example, many applications, for example some Integrated Development Environments (IDEs), include multiple windows presenting different information. Frequently, during a presentation, the relevant portion for a participant can be one window (e.g., editor window), but, for another participant, the relevant portion is another window of the same application (e.g., outline view). The result can be a confusing experience for one or more participants attempting to focus on relevant content.

BRIEF SUMMARY

One aspect of the present invention can include a system, an apparatus, a computer program product and a method for permitting participant configurable view selection within a screen sharing session. A screen sharing session between a participating computer and a presenting computer can be established. A copy of a graphical user interface screen from the presenting computer can be presented within a display on the participating computer. A selection of the sub-portion of the copy of the graphical user interface screen from the participating computer can be received. Boundaries of the sub-portion can be determined and transmitted from the participating computer to the presenting computer. Responsive to receiving the boundaries, the remotely located computer can define the sub-portion of the graphical user interface screen of the presenting computer. The defined sub-portion of the graphical user interface screen can be conveyed over a network from the presenting computer to the participating computer without conveying data for other portions of the graphical user interface screen.

Another aspect of the present invention can include a system, an apparatus, a computer program product and a method for permitting participant configurable view selection within a screen sharing session. An application can execute on a first computer which can present content on a first display of the first computer. A set of remotely located computers can each receive a sub-portion of the content on the first display. The set of remotely located computers can include a second computer, a third computer, and/or an nth number of computers. A second user-specific sub-portion of the content of the first display can be defined. Only the second user-specific sub-portion of the content of the first display can be sent from the first computer to the second computer meaning the non-selected portion of the content is never conveyed from the first computer to the second computer. The second computer can display the second user-specific sub-portion of the content on a second display of the second computer. A third user-specific sub-portion of the content of the first display can be selected. The third user-specific sub-portion of the content of the first display can be sent from the first computer to the third computer meaning the non-selected portion of the content is never conveyed from the first computer to the third computer. The third computer can display the third user-specific sub-portion of the content on a third display of the third computer.

Yet another aspect of the present invention can include a system, an apparatus, a computer program product and a method for permitting participant configurable view selection within a screen sharing session. A screen sharing engine can be configured to selectively convey a user-specified portion of a shared content within a screen sharing session of a presenting computing device to a participating computing device. A data store can be able to persist a mapping and/or a user preference. The mapping can associate a position and/or a dimension of the portion. The user preference can be associated with the user-specified portion.

DETAILED DESCRIPTION

Figure 1:
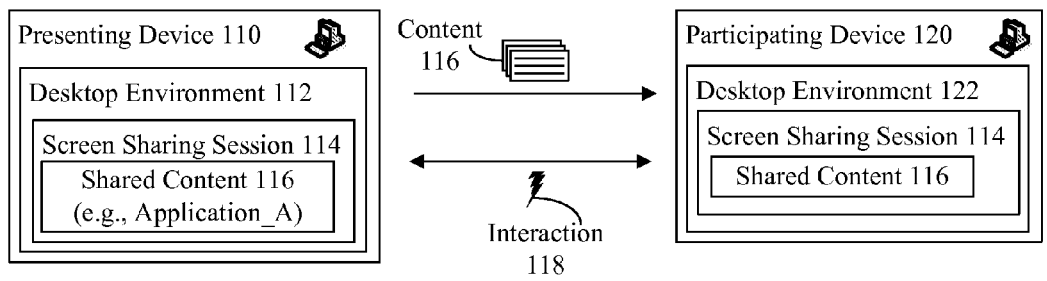
FIG. 1 is a schematic diagram illustrating a scenario for permitting participant configurable view selection within a screen sharing session in accordance with an embodiment of the inventive arrangements disclosed herein.
Figure 1:
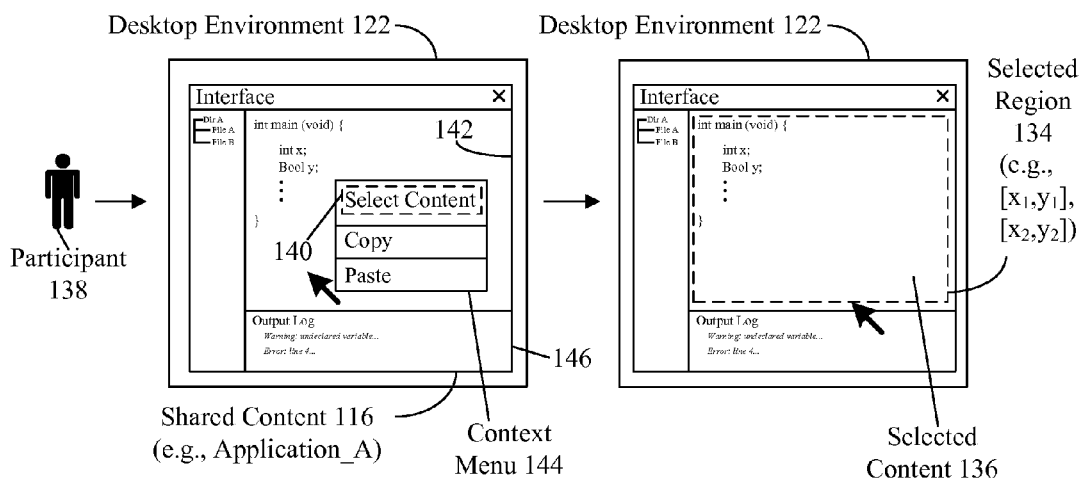
Figure 1:
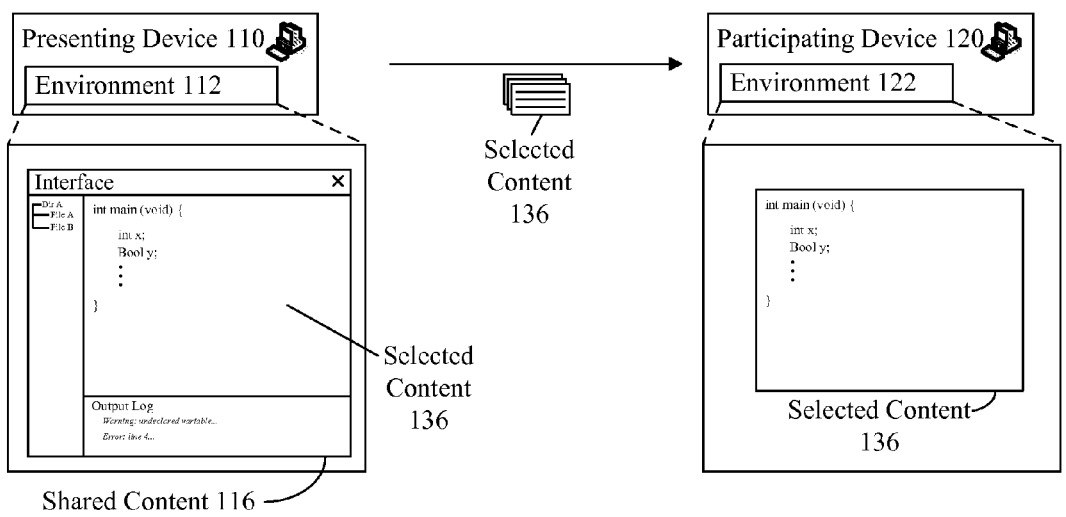

The present disclosure is a solution for permitting participant configurable view selection within a screen sharing session. In the solution, a presenter and a participant can engage in a screen sharing session (e.g., desktop sharing). In the session, the presenter can interact with a computing device to select content to be shared. For example, the presenter can select an application on the presenter's laptop to share with the participant. The content can be presented on a computing device utilized by the participant (e.g., participant's mobile phone). The participant can select content within the display of the different computing device which can be relevant. For example, the participant can use a marquee tool to select a portion of the application which has value to the participant. The selected content can be transmitted to the different computing device associated with the participant for the remainder of the session. That is, content not selected by the participant is not transmitted to the computing device associated with the participant.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a presenting computer or entirely on the presenting computer or server. In the latter scenario, the presenting computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a scenario 100 for permitting participant configurable view selection within a screen sharing session in accordance with an embodiment of the inventive arrangements disclosed herein. Scenario 100 can be present in the context of method 200, system 300, and interface 400. In scenario 100, a screen sharing session 114 can be established between a presenting device 110 and a participating device 120. The presenting device 110 and the participating device 120 can be communicatively linked via one or more networks. The session 114 can permit shared content 116 (e.g., Application_A) within session 114 to be received by device 120. For example, a participant 138 can view an Application_A executing in desktop environment 112 within desktop environment 122 of the remote device 120. The content 116 can be transmitted from device 110 over the one or more networks to device 120. For example, the transmitted content can be a bitmap image of shared content 116 which can be encoded for network transmission (e.g., packetized). Scenario 100 can represent one type of screen sharing (e.g., host and guest) and should not be construed to limit the invention in this regard. It should be appreciated that the disclosure can support multiple shared content 116 to be shared. That is, a participant 138 can select multiple sub-portions (e.g., frame 142, 146) to be presented upon desktop environment 122.

As used herein, presenting device 110 can be a computing device able to share content 116 within a screen sharing session 114. For example, device 110 can be a desktop computer executing a remote desktop service which can share an application (e.g., Application_A). Participating device 120 can be a computing device able to receive content 116 which can be presented within the session 114 of desktop environment 122. For example, device 120 can be a mobile phone receiving an interactive view of content 116. Interaction 118 with shared content 116 within environment 122 can affect content 116 within desktop environment 112. For example, session 114 can be a desktop sharing session allowing a participant 138 to interact with shared content 116 via desktop environment 122. That is, content 116 within environment 112 can be mirrored within environment 122 enabling collaboration between a user acting as a presenter and a participant (e.g., participant 138). For example, a copy of the graphical user interface shared by presenting device 110 can be displayed on participating device 120. It should be appreciated that interaction 118 can occur in real-time or near real-time.

Presenting device 110 and participating device can utilize a desktop environment 112, 122 to permit interaction with session 114 and content 116, 136. Desktop environment 112, 122 can be a graphical user interface for accessing, configuring, and modifying shared content 116. Environment 112 can include a window manager, an environment application programming interface (API), and the like. Environment 112 can include, but is not limited to, JAVA based Desktop Environment, K Desktop Environment (KDE), GNOME, Xfce, and the like. Environment 112, 122 can include content which can be shared as content 116. Shared content 116 can include icons, windows, toolbars, folders, wallpapers, desktop widgets, and the like. For example, shared content 116 can be a file manager hierarchy view (e.g., tree view).

In scenario 100, shared content 116 can be an application executing within environment 112. The application can include a window and/or one or more frames (e.g., frame 142) presenting content. For example, the application can be an integrated development environment (IDE) with a parent window, a first frame presenting source code (e.g., frame 142), a second frame presenting compilation output (e.g., frame 146), and a third frame presenting project information. It should be appreciated that the scenario is not limited to multiple frames and can permit content selection with a single content frame.

During session 114, participant 138 can interact with selected content 136 to select relevant content. For example, participant 138 can right click on Application_A (e.g., selected content 136) to obtain options within a context menu 144 for selecting content. Selected region 134 can be created manually and/or automatically. In one instance, selection of content menu 144 option 140 can present a selection tool to manually create region 134. For example, region 134 can be created by dragging a mouse cursor diagonally from a start point to an end point to establish a rectangular region around content of interest. In another instance, content selection can be rapidly selected by leveraging application segmentation. In the instance, frame 142 can be automatically determined from application hierarchy (e.g., parent/child window relationship). For example, when context menu 144 is presented within frame 142, choosing selection option 140 can automatically select the frame 142 as selected content based on mouse focus.

In one embodiment, selected region 134 can be visually distinguished utilizing one or more traditional and/or proprietary effects. For example, region 134 can be visually distinguished using a marquee effect (e.g., marching ants). Visual distinction can include, but is not limited to, two dimensional graphical effects, three dimensional graphical effects, and the like. Visual distinction can include, but is not limited to, colorization effects, fading effects, shading effects, highlighting effects, and the like.

In one instance, the selected region 134 dimension and position can be determined upon selection creation. In the instance, the selected region 134 can correspond to coordinates of a Cartesian coordinate system. For example, region 134 can correspond to two coordinate pairs which form a rectangle having a top left hand coordinate position at (x1, y1) and bottom right hand coordinate position at (x2, y2). Selected region 134 information can be conveyed to presenting device 110 to enable selected content 136 to be transmitted. Device 110 can process region 134 information to determine selected content 136. For example, a mapping of selected region within desktop environment 122 based on selected region 134 can be created to enable selected content to be determined. Selected content 136 can be communicated to device 120 for the remainder of the session 114. For example, a sub-portion of a graphical user interface shared by presenting device 110 can be displayed on participating device 120. That is, content not selected (e.g., frame 146) is not transmitted to the device 120. It should be appreciated that this functionality of the disclosure (e.g., not transmitting non-selected content) is different from existing shared screen session capabilities.

Drawings presented herein are for illustrated purposes only and should not be construed to limit the invention in any regard. It should be appreciated that presenting device 110 and participating device 120 can be proximately or remotely located to each other. It should be appreciated that selected content 136 can be chosen utilizing traditional and/or proprietary mechanisms. In one instance, selected content 136 can be picked using a magic wand selection tool, a lasso selection tool, and the like. It should be appreciated that the disclosure can function within environments which support multiple desktops. In one instance, when desktop environment 112 changes from a desktop displaying content 116 to a different desktop displaying different content, content 116 can persist within environment 122. In another instance, when desktop environment 112 changes from a desktop displaying content 116 to a different desktop displaying different content, an appropriate selected content for the different desktop can be displayed within environment 122.

In one instance, desktop environment 112 and/or environment 122 type can be a two dimensional desktop environment, three dimensional desktop environment, and the like. It should be appreciated that the disclosure can support any combination of desktop type. For example, the disclosure can support content selection between a three dimensional environment 112 and a two dimensional desktop environment 122. Content selection within three dimensional environments can be achieved utilizing traditional and/or proprietary selection mechanisms.

Figure 2:
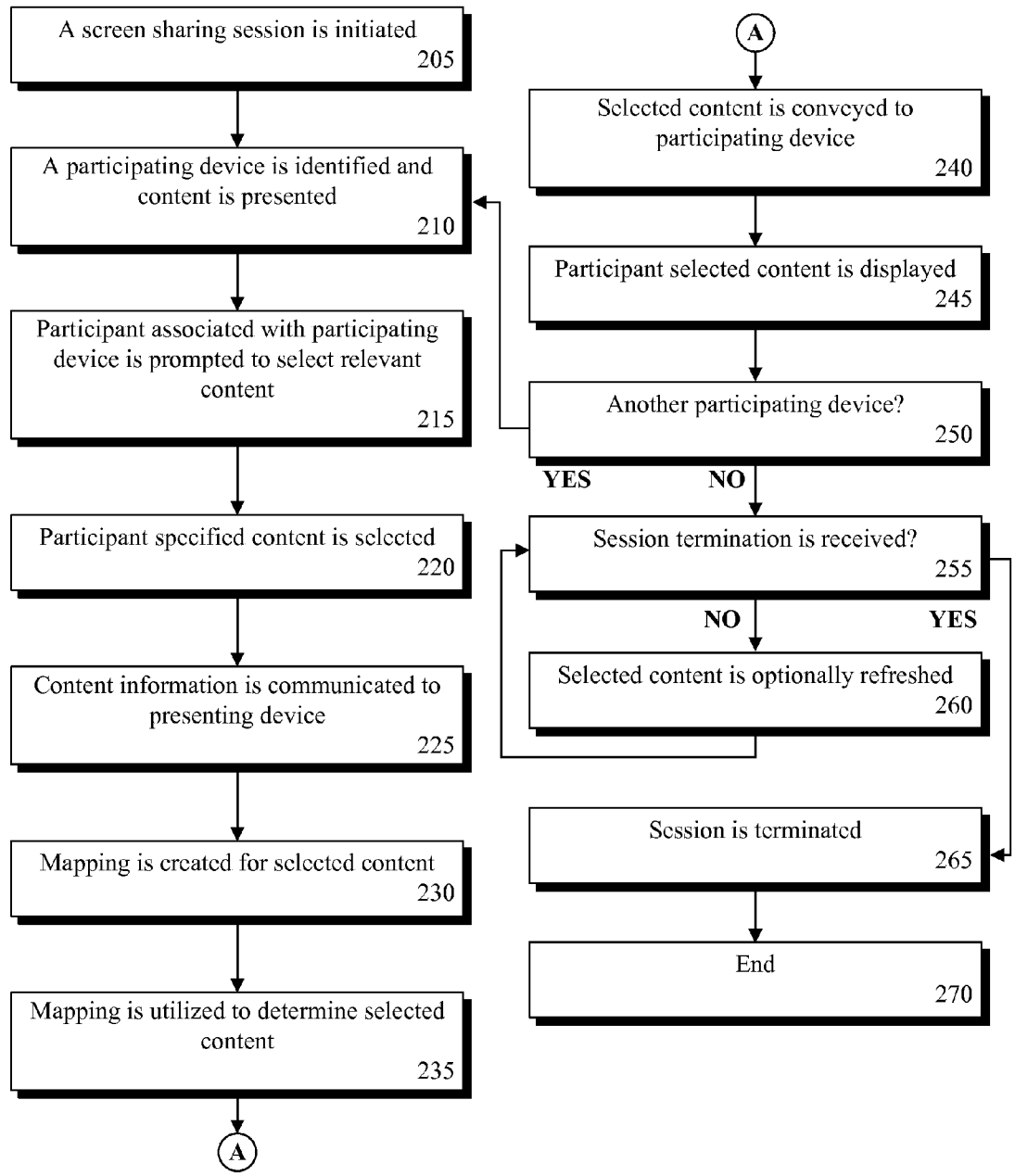
FIG. 2 is a schematic diagram illustrating a method for permitting participant configurable view selection within a screen sharing session in accordance with an embodiment of the inventive arrangements disclosed herein.

FIG. 2 is a schematic diagram illustrating a method 200 for permitting participant configurable view selection within a screen sharing session in accordance with an embodiment of the inventive arrangements disclosed herein. Method 200 can be performed in the context of scenario 100, system 300, and interface 400. In method 200, a shared screen session can be initiated between a presenting device and a participating device. A shared screen session can share content between the presenting device and the participating device. For example, the shared screen session can be a Virtual Network Computing (VNC) session. A participant utilizing a participating device can select content to be shared. The selected content can be exclusively conveyed to the participating device. The selected content can be conveyed for the duration of the session.

In step 205, a screen sharing session can be initiated. The session can be initiated in a traditional and/or proprietary manner. For example, the screen sharing session can be initiated via an email invitation. In step 210, a participating device can be identified and the content can be presented. The participating device can be automatically and/or manually identified. In step 215, a participant associated with the participating device can be prompted to select relevant content. In one instance, the participant can be prompted via a pop-up dialog. In the instance, the pop-up dialog can present one or more tools which can be utilized by the participant to select content. In step 220, the participant specified content can be selected. In step 225, the selected content information can be communicated to the presenting device. In step 230, a mapping can be created for the selected content. In step 235, the mapping can be utilized to determine selected content. In one instance, the mapping can determine a screen area of the presenting device corresponding to a selected region (e.g., participant selected content) of a participating device.

In step 240, the selected content can be conveyed to the participating device. The selected content can be conveyed in a traditional and/or proprietary manner. In step 245, the participant selected content can be displayed upon the participating device. In step 250, if another participating device is present in the session, the method can return to step 210, else continue to step 255. In step 255, if the session termination is received, the method can continue to step 265, else continue to step 260. In step 260, the selected content can be optionally refreshed. In step 265, the session can be terminated. In step 270, the method can end.

Drawings presented herein are for illustrative purposes only and should not be construed to limit the invention in any regard. Method 200 can be performed in real-time or near real-time. Method 200 can be performed in serial or in parallel. It should be appreciated that method 200 can be a functionality of an application programming interface (API). Steps 210-250 can be optionally performed for each participating device within the shared screen session.

Figure 3:
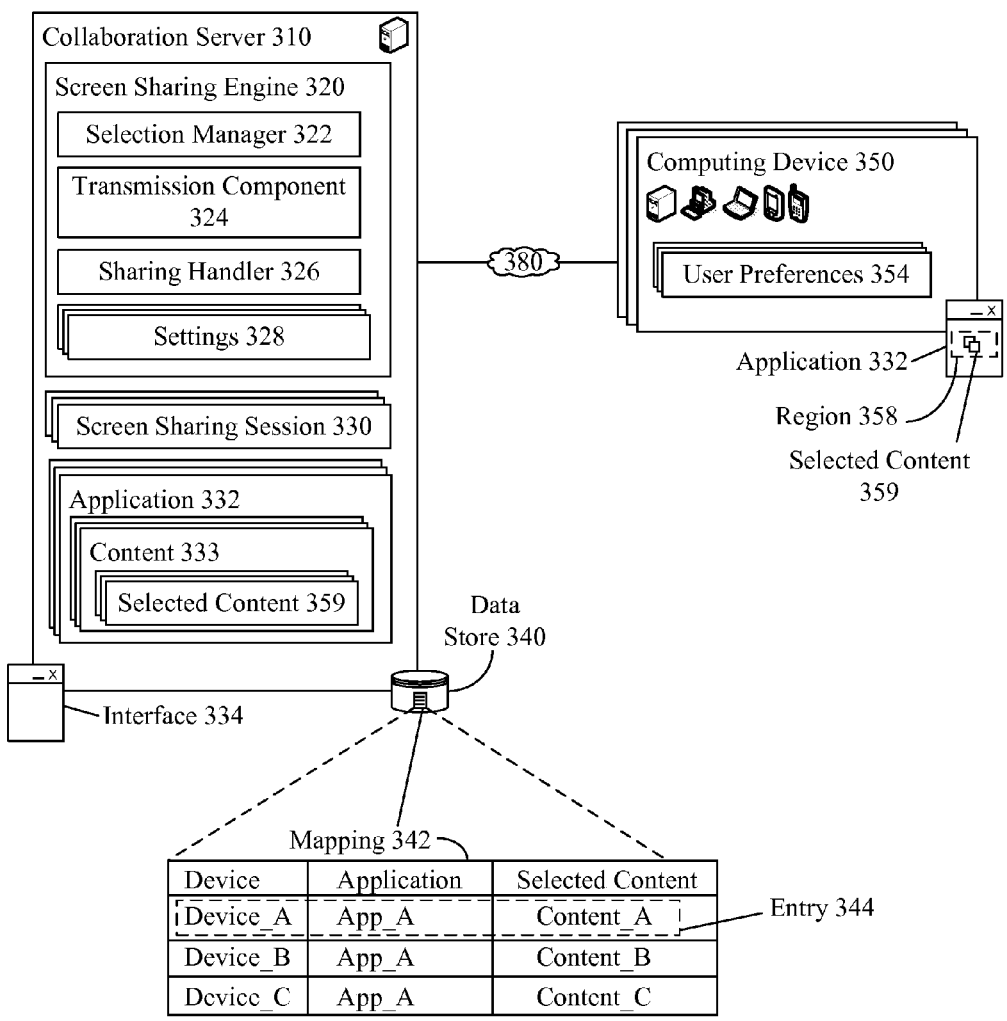
FIG. 3 is a schematic diagram illustrating a system for permitting participant configurable view selection within a screen sharing session in accordance with an embodiment of the inventive arrangements disclosed herein.

FIG. 3 is a schematic diagram illustrating a system 300 for permitting participant configurable view selection within a screen sharing session in accordance with an embodiment of the inventive arrangements disclosed herein. System 300 can be present in the context of scenario 100, method 200, and/or interface 400. In system 300, a screen sharing engine 320 can permit a participant to select a region 358 of application 332 which can be selectively conveyed to device 350 during screen sharing session 330. In one instance, the region 358 can be defined within user preferences 354 to enable persistent content selection over multiple sessions 330. Server 310 can be communicatively linked to one or more devices 350 by one or more networks 380. Computing device 350 can be proximally and/or remotely located from server 310. In one instance, multiple devices 350 can be geographically distant from each other.

Collaboration server 310 can be a hardware/software entity able to provide function for assisting participants of a screen sharing session 330 to achieve a common task. Server 310 functionality can include, but is not limited to, session 330 security, session 330 authentication, session 330 encryption, session network throughput load balancing and the like. Server 310 can include, but is not limited to, screen sharing engine 320, screen sharing session 330, application 332, interface 334, data store 340, and the like. In one embodiment, server 310 can be an IBM LOTUS SAMETIME server.

Screen sharing engine 320 can be a hardware/software element for permitting real-time collaboration between one or more computing devices 350. It should be appreciated that real-time collaboration functionality can include remote login capabilities. Engine 320 functionality can include, but is not limited to, content 333 selection, session 330 initiation, session 330 maintenance, session 330 termination, and the like. Engine 320 can include, but is not limited to, selection manager 322, transmission component 324, sharing handler 326, settings 328, and the like. In one embodiment, engine 320 can be a functionality of IBM LOTUS SAMETIME software. For example, engine 320 can be a functionality of IBM LOTUS SAMETIME client.

Selection manager 322 can be a hardware/software component for enabling content 333 selection within application 332 from device 350. Selection manager 322 functionality can include, graphical user interface rendering (e.g., visual selection indicators), toolbar presentation (e.g., selection toolbar), and the like. In one instance, selection manager 322 can permit additive and subtractive selection of content 333. For example, a region 358 can be dynamically grown by a participant when the participant draws a new region within application 332. In one configuration of the instance, region 358 can be manipulated utilizing traditional and/or proprietary mechanisms. For example, region 358 can be shrunk by an arbitrary number of pixels through a shrink region interface dialog. In one instance, region 358 can be specified using a traditional masking image editing functionality. For example, a participant can graphically paint region 358 with a mask selection tool. In one embodiment, selection manager 322 can permit saved selections to be persisted (e.g., settings 328) between sessions 330.

Transmission component 324 can be a hardware/software entity for selectively conveying participant specified content (e.g., selected content 359). Component 324 functionality can include, but is not limited to, selected content 359 compression, content 359 ordering, content 359 verification (e.g., checksum), and the like. Component 324 can support traditional and/or proprietary communication protocols. Protocols can include, but is not limited to, Transmission Control Protocol (TCP), Internet Protocol (IP), Remote Frame Buffer (RFB) protocol, Session Initiation Protocol (SIP), and the like.

Sharing handler 326 can be a hardware/software component for managing content selection within session 330. Handler 326 functionality can include, but is not limited to, mapping 342 creation, mapping 342 maintenance, mapping 342 storage, and the like. In one instance, handler 326 can be utilized to retrieve relevant mappings for each session. In the instance, selected content 359 can be determined based on participant credentials. In one embodiment, handler 326 can support location awareness, computing device 350 resource availability, and the like.

Settings 328 can be one or more options for establishing the behavior of system 300, server 310, and/or engine 320. Settings 328 can be manually and/or automatically established. Settings 328 can include, but is not limited to, selection manager 322 options, transmission component 324 settings, sharing handler 326 options, and the like. In one instance, settings 328 can be presented within interface 334 permitting user configuration. For example, an administrator can configure settings 328 which can be presented within an administrative interface.

Screen sharing session 330 can be a semi-permanent interactive information interchange between two or more computing devices 350. Session 330 can include, but is not limited to, a remote desktop session, a desktop sharing session, an application sharing session, and the like. In one instance, session 330 can be a functionality of a web conferencing software. Session 330 can include a multi-chat session, telephony session, and the like. In one embodiment, session 330 can include multiple screen sharing sessions.

Application 332 can be one or more programs permitting user interaction to perform a task. Application 332 can include, but is not limited to, business software, computer-aided design software, database software, decision-making software, educational software, image editing software, industrial automation software, spreadsheet software, telecommunication software, video editing software, video game software, word processing, and the like. For example, application 332 can include multiple applications such as a web browser and a file manager. Application 332 can include, but is not limited to, content 333, settings, and the like. In one instance, application 332 can execute within server 310, device 350, and the like.

Content 333 can be a visual media associated with application 332. Content 333 can include, but is not limited to, text content, images, video, animation, and the like. Content 333 can include, but is not limited to, document content, data content, application content, electronic service content, web page content, electronic mail message content, and the like. Content 333 can include user generated content, automatically generated content, and the like.

Selected content 359 can be a visual media associated with content 333. Content 359 can include, but is not limited to, text content, images, video, animation, and the like. Content 359 can include, but is not limited to, document content, data content, application content, electronic service content, web page content, electronic mail message content, and the like. Selected content 359 can include user generated content, automatically generated content, and the like.

Interface 334 can be a user interactive component permitting interaction and/or presentation mapping 342, settings 328, and the like. Interface 334 can be present within the context of an administrative interface, a web browser application, an integrated development environment (IDE), and the like. In one embodiment, interface 334 can be a screen of an IBM LOTUS SAMETIME server configuration interface. Interface 334 capabilities can include a graphical user interface (GUI), voice user interface (VUI), mixed-mode interface, and the like. Interface 334 can be communicatively linked to server 310.

Data store 340 can be a hardware/software component able to persist mapping 342, settings 328, and the like. Data store 340 can be a Storage Area Network (SAN), Network Attached Storage (NAS), and the like. Data store 340 can conform to a relational database management system (RDBMS), object oriented database management system (OODBMS), and the like. Data store 340 can be communicatively linked to server 310 in one or more traditional and/or proprietary mechanisms. In one instance, data store 340 can be a component of Structured Query Language (SQL) complaint database.

Mapping 342 can be a dataset utilized to determine selected content within content 333. Mapping 342 can include, but is not limited to, a device identifier, an application identifier, a selected content identifier, a content identifier, a participant identifier, position information, dimension information, and the like. For example, mapping 342 can include an entry 344 which can associate a selected content (e.g., Content_A) with an application (e.g., App_A) and a computing device (e.g., Device_A). In one instance, mapping 342 can be dynamically updated during session 330. In the instance, mapping 342 can permit selected content to change in real-time based on participant requirements.

Computing device 350 can be a software/hardware element for executing session 330. Device 360 can include, but is not limited to, user preferences, 354, application 332, and the like. Hardware can include, but is not limited to, a processor, a non-volatile memory, a volatile memory, a bus, and the like. Computing device 350 can include, but is not limited to, a desktop computer, a laptop computer, a mobile phone, a mobile computing device, a portable media player, a Personal Digital Assistant (PDA), and the like.

User preferences 354 can be one or more established settings associated with selected content 359, application 332, session 330, and/or content 333. Preferences 354 can be manually and/or automatically established. In one instance, historic preferences can be utilized to build preferences 354. In one instance, frequently used portions of an application 332 can be employed to determine content preference. In the instance, region 358 can be automatically determined and selected content 359 can be automatically conveyed.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawings presented herein are for illustrative purposes only and should not be construed to limit the invention in any regard. In one embodiment, the disclosure can be leveraged to improve view capabilities of one or more collaborative tools. In the embodiment, selective content sharing can be achieved within a streaming content, a slideshow presentation, a recording, a whiteboard presentation, and the like. In one instance, engine 320 can be a functionality of a screen sharing service. In one embodiment, engine 320 can be a functionality of a collaboration appliance device.

Figure 4:
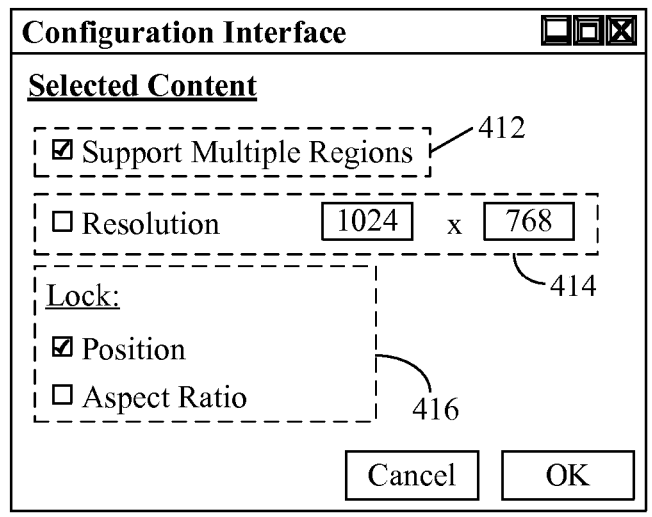
FIG. 4 is a schematic diagram illustrating an interface for permitting participant configurable view selection within a screen sharing session in accordance with an embodiment of the inventive arrangements disclosed herein.

FIG. 4 is a schematic diagram illustrating an interface 400 for permitting participant configurable view selection within a screen sharing session in accordance with an embodiment of the inventive arrangements disclosed herein. Interface 400 can be present in the context of scenario 100, method 200, and/or system 300. In interface 400, options 412, 414, 416 associated with a selected content can be configured. Configuration can occur prior to the session initiation, during the session, and/or after session termination. In one instance, interface 400 can be presented within a pop-up dialog.

Interface 400 can include, but is not limited to, options 412, 414, and/or 416 which can be participant configurable. Option 412 can permit multiple content selection capabilities enabling highly customizable content selection. For example, a participant can specify two regions for which content can be conveyed. Option 414 can allow resolution specifications to be set for displaying selected content. In one instance, option 414 can include a default setting based on a participating device display resolution. In one embodiment, option 414 can include aspect ratio settings. In another instance, option 414 can permit the magnification of selected content by a participant specified factor. Option 416 can permit presentation settings for selected content to be specified. In option 416, position, aspect ratio, and the like can be locked. For example, a window displaying selected content can be "stickied" (e.g., pinned) to a participant specified location.

In one embodiment, when multiple regions are shared, the shared content can be positionable and adjustable on the local display of the device receiving the content, independent of the other participants. Positions of the sub-portions can vary. For example, in a wide angle display, a participant can position the sub-portions side by side in a left-to right position, but when the display device is rotated to be in a long view format, the sub-portions can be shifted (either automatically or manually by the participant) such that the sub-portions are positioned in a top to bottom position. Alternatively, the participant can choose to stack the sub-portions over one another. That is, how a participant positions the sub-portion on their local display device is up to them and is independent of how other participants in the same session re-position their sub-portions.

Drawings presented herein are for illustrative purposes only and should not be construed to limit the invention in any regard. Interface 400 can be present in the context of a context menu, drop-down menu, configuration interface screen, and the like. In one instance, interface 400 can include screen sharing options, region selection options (e.g., visual options), and the like.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for improving application sharing comprising:
one or more processors;
one or more non-transitory storage mediums storing program instructions that are executed by at least one of the one or more processors;
a screen sharing engine, comprising at least a portion of the program instructions, configured to selectively share screen comprising a first and a second user-specified portion of a shared content within a screen sharing session of a multi-sectioned application having three or more distinct GUI sections each being a GUI frame of the multi-sectioned application, said distinct GUI sections comprising a first section corresponding to the first user-selected portion, a second section corresponding to the second user-specified portion, and a third section of a presenting computing device to a participating computing device in a real-time or a near real-time, without conveying data associated with non-user-specified portions of the screen sharing session, wherein the non-user specified portions comprises at least the third section, wherein the first and the section user-specified portion is determined by a participant utilizing the participating computing device, wherein the first and the second user specified portion presented within the participating computing device is displayed differently than the non-user specified portions on the presenting computing device, wherein the difference is at least one of an aspect ratio, a resolution, and a color depth; and
a data store, within at least one of the one or more non-transitory storage mediums, able to persist at least one of a mapping and a user preference, wherein the mapping associates at least one of a position and a dimension of the portion, wherein the user preference is associated with the first section and the second section, wherein the first section, the second section, and the third section each correspond to a frame of the multi-sectioned application.

2. The system of claim 1, wherein the third section of the shared content not associated with the user-specified portion is not transmitted to the participating computing device.

3. The system of claim 1, further comprising:
a selection manager, comprising at least a portion of the program instructions, configured to receive the first and the second user-specified portion of the shared content;
a transmission component, comprising at least a portion of the program instructions, able to convey the first and the second user-specified portion of the shared content to the participating computing device; and
a sharing handler, comprising at least a portion of the program instructions, capable of mapping the first and the second user-specified portion of the shared content to a portion of the shared content.

4. The system of claim 1, wherein the system is a component of an integrated development environment (IDE) application.

5. The system of claim 1, wherein the system is a component of a display driver within the presenting computing device.

6. A computer program product comprising:
one or more non-transitory computer-readable storage devices;
program instructions, stored on at least one of the one or more non-transitory computer readable storage devices, to establish a screen sharing session between a participating computer and a presenting computer running and presenting a multi-sectioned application having a plurality of different interface frames;
program instructions, stored on at least one of the one or more non-transitory computer readable storage devices, to present within a display on the participating computer, a copy of a graphical user interface screen from the presenting computer in a real-time or a near real-time, within the screen sharing session;
program instructions, stored on at least one of the one or more non-transitory computer readable storage devices, to receive a selection of the sub-portion of the copy of the graphical user interface screen from the participating computer, said sub-portion corresponding to at least one of the different interface frames of the multi-sectioned application; and program instructions, stored on at least one of the one or more non-transitory computer readable storage devices, to determine boundaries of the sub-portion for the selected one of the different interface frames, and transmitting the boundaries from the participating computer to the presenting computer, without conveying data for other portions of the graphical user interface screen, wherein content from non-selected ones of the different interface frames is considered outside the determined boundaries and is not conveyed, wherein the sub-portion associated with the selection as presented within the participating computer is displayed differently than on the presenting computer, wherein the difference is at least one of an aspect ratio, a resolution, and a color depth.

7. The computer program product of claim 6, further comprising:

program instructions, stored on at least one of the one or more non-transitory computer readable storage devices, to, responsive to receiving the boundaries, define at the remotely located computer the sub-portion of the graphical user interface screen of the presenting computer; and program instructions, stored on at least one of the one or more non-transitory computer readable storage devices, to convey over a network from the presenting computer to the participating computer, the defined sub-portion of the graphical user interface screen without conveying data for other portions of the graphical user interface screen, which conserves on bandwidth conveyed over the network.

8. The computer program product of claim 7, wherein the receiving of the boundaries and the conveying of the sub-portion is independent of content of the graphical user interface handled by the presenting computer for any device other than the participating computer.

9. The computer program product of claim 6, wherein the presenting computer provides at least a portion of the graphical user interface screen to a plurality of different computers, including the participating computer, wherein the boundaries defined for the participating computer, which affects the sub-portion of the graphical user interface screen sent from the presenting computer to the participating computer has no effect on other ones of the different computers.

10. The computer program product of claim 6, wherein the boundaries defined for the participating computer, which affects the sub-portion of the graphical user interface screen sent from the presenting computer to the participating computer has no effect on a display of the graphical user interface screen for the presenting computer, which includes content outside the defined boundaries of the sub-portion.

11. A computer program product comprising:

one or more non-transitory computer-readable storage devices;

program instructions, stored on at least one of the one or more non-transitory computer-readable storage devices, to establish a screen sharing session between a second computer and a first computer and between a third computer and the second computer;

program instructions, stored on at least one of the one or more non-transitory computer-readable storage devices, to present within a display on the second computer, a copy of a graphical user interface screen from the first computer;

program instructions, stored on at least one of the one or more non-transitory computer-readable storage devices, to receive a selection of a sub-portion of the copy of the graphical user interface screen from the second computer;

program instructions, stored on at least one of the one or more non-transitory computer-readable storage devices, to communicate the selection of the sub-portion from the second computer to the third computer; and program instructions, stored on at least one of the one or more non-transitory computer-readable storage devices, to cause the third computer to display the selection of the sub-portion on a third display of the third computer, wherein the sub-portion selected and presented within the first computer is displayed differently on the first computer than the sub-portion is displayed on the third computing device, wherein the difference is at least one of an aspect ratio, a resolution, and a color depth.

12. The computer program product of claim 11, wherein the content is content for a live or recorded presentation that is provided from the first computer to at least one of the first computer and the second computer over a network.

13. The computer program product of claim 11, wherein the content is content for a real-time remote desktop session that is provided from the first computer to at least one of the second computer and the third computer over a network.

14. The computer program product of claim 11, further comprising:

program instructions, stored on at least one of the one or more non-transitory computer-readable storage devices, to receive over a network from the first computer to the second computer, the defined sub-portion of the graphical user interface screen without conveying data for other portions of the graphical user interface screen, which conserves on bandwidth conveyed over the network.

15. The computer program product of claim 11, wherein the sub-portion is independent of content of the graphical user interface handled by the first computer for any device other than the second and third computer.

16. The computer program product of claim 11, further comprising: program instructions, stored on at least one of the one or more non-transitory computer-readable storage devices, to determine boundaries of the sub-portion, and transmitting the boundaries from the second computer to the third computer, without conveying data for other portions of the graphical user interface screen.

17. The computer program product of claim 16, wherein the boundaries defined for the third computer, which affects the at least one sub-portion of the graphical user interface screen sent from the second computer to the third computer has no effect on a display of the graphical user interface screen for the second computer, which includes content outside the defined boundaries of the at least one sub-portion.

18. The computer program product of claim 16, wherein the boundaries comprise of at least one of a position and a dimension associated with the graphical user interface.

19. The computer program product of claim 11, wherein the sub-portion is redefined during a session by a user of the first computer.

20. The computer program product of claim 11, wherein a user of the first computer defines multiple concurrent sub-portions within a screen sharing session.

* * * * *